July 19, 1966  B. E. SHLESINGER, JR  3,261,938
FLUID PRESSURE OPERATED PROGRAMMING SWITCH MULTIPLE TYPE
Filed June 15, 1964  2 Sheets-Sheet 1

INVENTOR
Bernard Edward Shlesinger, Jr.

BY Shlesinger, Shlesinger & Arkwright
ATTORNEYS

July 19, 1966 B. E. SHLESINGER, JR 3,261,938
FLUID PRESSURE OPERATED PROGRAMMING SWITCH MULTIPLE TYPE
Filed June 15, 1964 2 Sheets-Sheet 2
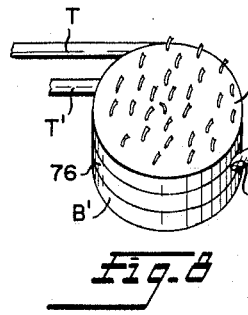
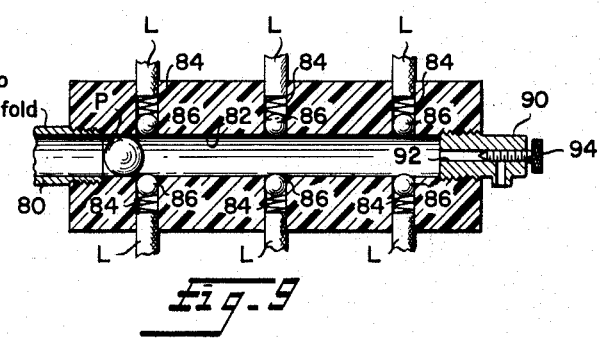
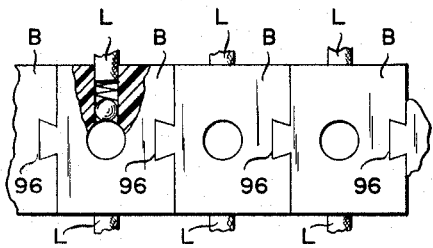
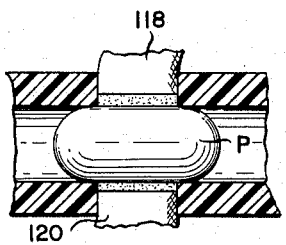
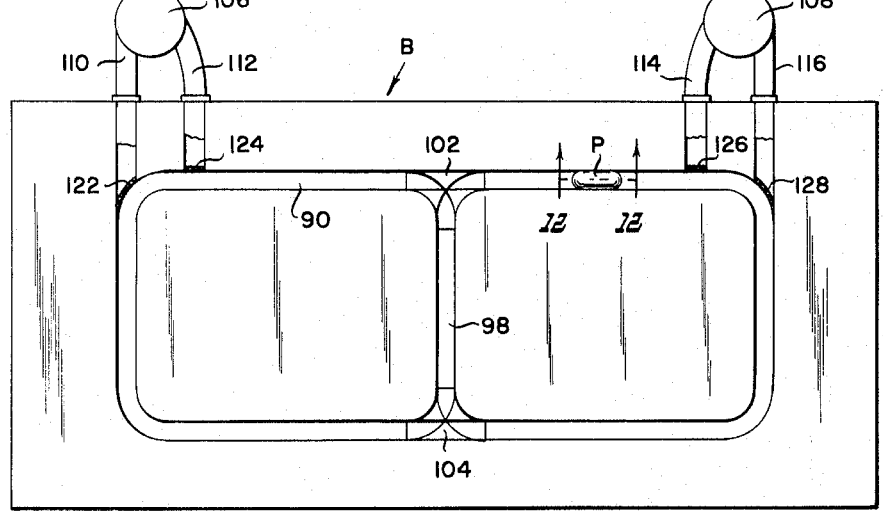
INVENTOR
Bernard Edward Shlesinger, Jr.
ATTORNEYS

United States Patent Office 3,261,938
Patented July 19, 1966

3,261,938
FLUID PRESSURE OPERATED PROGRAMMING SWITCH MULTIPLE TYPE
Bernard Edward Shlesinger, Jr., 906 Bruce Lane, Annandale, Va.
Filed June 15, 1964, Ser. No. 375,003
25 Claims. (Cl. 200—81)

This invention relates to improvements in multiple contact switch programming systems and the like of the fluid pressure type. Broadly, it might be considered to fall in the class of switches as illustrated by my Patents 3,027,435 issued March 27, 1962 and 3,047,683 issued July 31, 1962.

Prior art programming switches of the fluid type in which a variable timer mechanism has been used, have in general been quite complex, difficult to repair, and not easily adaptable for different types of equipment and jobs.

It is an object of this invention to provide a fluid multiple contact programming switch which is relatively simple in construction, readily adaptable for all types of equipment and jobs, and inexpensive in cost and maintenance.

A further object of this invention is to provide a fluid programming switch which has a built in adjustable timing mechanism.

Still another object of this invention is to provide a multiple contact programming switch for use in computing, aircraft, missiles, telemetry, telephony, and the like.

Yet a further object of this invention is to provide a programming switch system which is selective with respect to different circuits.

Still a further object of this invention is to provide a programming system which can be used in simple contact switching arrangements or in complex switching arrangements such as used in conjunction with pressure switches, microswitches, and other complex switching devices.

Yet another object of this invention is to provide a programming switch which is capable of being repetitive or discontinuous as desired.

It is a further object of this invention to provide a programming system which can be manufactured easily from plastic materials with a minimum of metallic parts.

Still another object of this invention is to provide a programming system which is compact yet simple to maintain.

These and other objects and advantages of this invention will be apparent from the following description and claims.

In the accompanying drawings which illustrate by way of example various embodiments of this invention;

FIGURE 8 is a perspective view showing a further modification of this invention;

FIGURE 9 is a cross sectional view of still a further modification of this invention;

FIGURE 10 is a side elevational view with a fragment broken away disclosing a coupled arrangement of the invention as disclosed in FIGURE 9;

FIGURE 11 is a schematic view showing one type of system as taught by this invention;

FIGURE 12 is an enlarged fragmentary view taken in cross section along the lines 12—12 of FIGURE 11 and viewed in the direction of the arrows.

Figure 1:
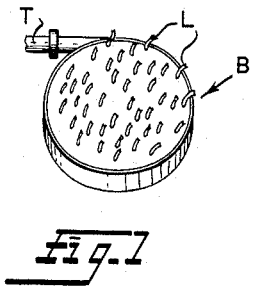
FIGURE 1 is a perspective view illustrating a helical switch as taught by this invention.

In FIGURE 1, the invention shows a block B having a connecting tubing T secured thereto for transmitting fluid to or from the block B. Connector leads L project into the block B for reasons hereinafter described.

Figure 2:
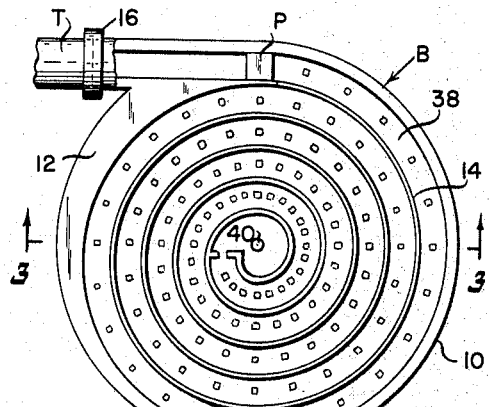
FIGURE 2 is a top plan view of the switch shown in FIGURE 1 with one cover plate removed and a portion of the connecting tubing broken away.
Figure 4:
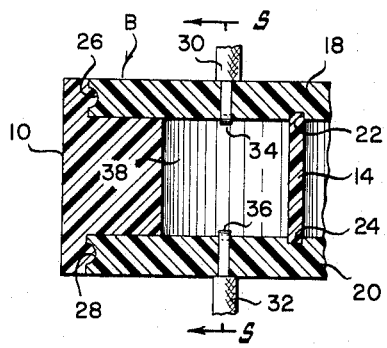
FIGURE 4 is a fragmentary enlarged cross sectional view showing contacts as used in this invention.

FIGURE 2 shows the block B including an outer wall member 10. It is to be noted that the outer wall member 10 gradually incrases in thickness as at 12. Connected to the edge of the outer wall member 10 is an inner wall member 14 which constitutes a coil spiral or helix. In the outer wall member 10 a nipple 16 is formed for connection to the tube T. As shown in FIGURE 4, the block B includes an upper plate member 18 and a lower plate member 20. Plate members 18 and 20 are provided with internal spiral grooves 22 and 24 for receiving the helical wall member 14. Plate members 18 and 20 and wall member 10 are provided with interlocking tongue and groove members 26 and 28 for maintaining the block in assembled relationship.

As will be noted in FIGURE 4, leads 30 and 32 are provided with contacts 34 and 36 which penetrate the plate members 18 and 20 and extend into the helical tubular shaped chamber 38.

A pellet P which has a cross sectional configuration similar to that of the chamber 38 is housed within the chamber 38 for reasons hereinafter disclosed.

Contacts 34 and 36 of leads 30 and 32 respectively may for the purposes of this invention be substituted by microswitch members of pressure contact members such as disclosed in my copending application 213,977 filed August 1, 1962 now Patent Number 3,193,630 for a Multiple Contact Switch Programming System.

As will be apparent from further consideration of this invention, the block B may be constructed of non-conductive material such as plastic, wood, glass and the like or it may be constructed of conductive materials such as metal, conductive plastics, etc. as will be obvious from further consideration of this invention.

Figure 3:
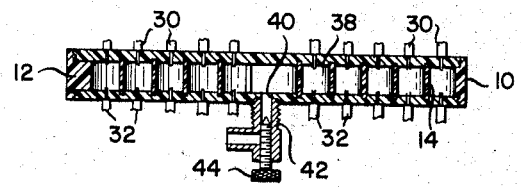
FIGURE 3 is a cross sectional view taken on the line 3—3 of FIGURE 2 and looking in the direction of the arrows.

At the center of one of the plate members, an opening 40 is provided as best seen in FIGURE 3. Associated with the opening 40 and leading therefrom is a tubular type member 42 which may be an L-shaped conduit as illustrated in FIGURE 3. A control valve such as needle valve 44 may be provided to restrict the opening 40. The valve may extend into the opening 40 or into the sleeve 42 as illustrated in FIGURE 3. The valve 44 may be omitted if required.

Figure 5:
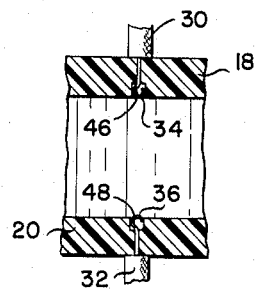
FIGURE 5 is a cross sectional view taken along the lines 5—5 of FIGURE 4 and viewed in the direction of the arrows.

In FIGURE 5, the plates 18 and 20 are shown having recessed openings 46 and 48 for receiving the contacts 34 and 36. The contact members 34 and 36 as shown in FIGURE 4 are hook-like and the hooks are of resilient nature for reasons hereinafter described.

*Modifications of helical type switch block*

Figure 6:
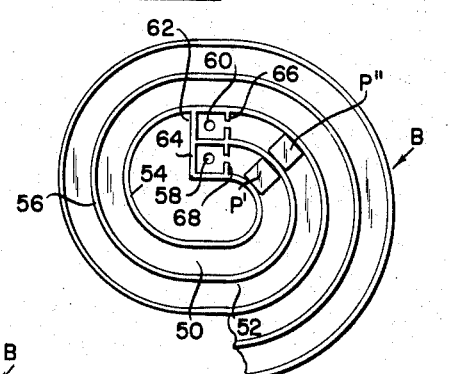
FIGURES 6 and 7 are fragmentary top plan views with the cover removed showing other modifications of this invention.
Figure 7:
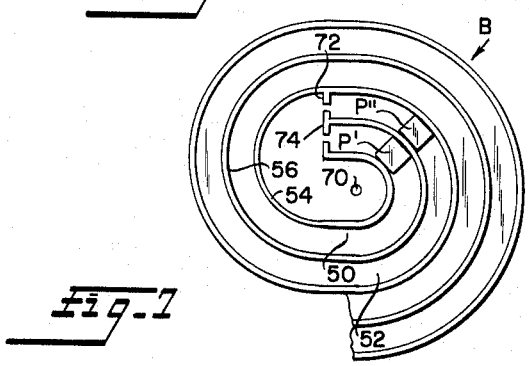

FIGURE 6 and FIGURE 7 show side by side passageways 50 and 52 for receiving pellets P' and P". In the configurations illustrated in FIGURES 6 and 7, insead of having a single inner helix 14 as in FIGURE 2, a pair of a side by side helixes 54 and 56 are utilized.

The helixes 54 and 56 channel pellets P' and P" in channels 50 and 52.

FIGURE 6 shows an opening 58 at the end of channel 50 and an opening 60 at the end of channel 52. The ends of the channels 50 and 52 are closed off by walls 62 and 64. Stops 66 and 68 are provided just before openings 58 and 60 to limit the movement of the pellets P' and P" as will be hereinafter described.

In FIGURE 7, and opening 70 is provided and centrally located of the block B. Stops 72 and 74 are provided to limit the travel of the pellets P' and P". The stops 66 and 68 may be walls having an opening therein or may be merely projections into the channels 50 and 52.

FIGURE 8 shows a slightly different modification from the previous figures and incorporates in general a pair of blocks B and B' which are separated by a central skirt member 76. A tube T leads to block B and a tube T' leads to block B'. The skirt 76 is provided for separating blocks B and B' from each other to permit the leads L to be gathered together in a single bundle 78. An opening 80 is provided in the skirt 76 for passage of the bundle 78 of leads L.

*Modification-linear type switches*

In FIGURE 9, the block B is provided with a straight bore 82. Leads L are provided with spring members 84 attached to a conductive ball or the like 86. The ball extends a short way into the passageway 82 in the manner as illustrated in my Patent 3,047,683 of July 31, 1962. Connected at one end of the block B is a fitting 80 which is subsequently connected to the manifold for receiving or removing fluid from the passageway 82. At the other end of the passageway 82 is provided a fitting 90 having an opening 92. The opening 92 is variably constricted by means of a needle valve 94. It will be obvious that some other constriction or restricting means might be used in place of the needle valve 94.

FIGURE 10 illustrates how the blocks B as represented in FIGURE 9 might be interconnected by tongue and groove members 96.

*Switching system having reversing feature*

In FIGURE 11, the block B is illustrated diagrammatically as having an oval channel 90 having a cross channel transit passageway 98. Switches 102 and 104 not illustrated in detail are provided for shifting the pellet P onto the cross passageway 98 from the oval track 90. Switches for pneumatic systems are generally old in the pneumatic art and Patent No. 600,536 to Johnson of 1898 shows various switching arrangements for pneumatic conveyors which could be utilized.

Associated with the Block B is a fluid pump mechanism 106 on one side of the block and 108 on the other side thereof. Connecting passageways 110 and 112 for pump 106 and 114 and 116 for pump 108 are provided connecting with the passageway 90 at the remote sides thereof. A series of contact members 118 and 120 as illustrated in FIGURE 12 would be provided along the passageway 90 and cross passageway 98. The connecting passageways 110, 112, 114 and 116 are provided with screening members 122, 124, 126 and 128 to prevent ingestion of the pellet P.

*Operation FIGURES 1 through 10*

In operation, air, liquid, or some similar fluid is pumped into the passageway in the block B through the tube T. The pellet P is thus forced in the direction of flow of the fluid through the passageway. In the case of pressure switches, the pressure member will be contacted by the pellet P and the circuit will be closed or opened as desired. In the case of conductive contacts as illustrated in FIGURES 3, 4 and 5, the pellet will have a conductive surface coating thereon which will make the circuit when passing through the passageways. The pellet may be a hollow member having a thin metal shell wall which will be deflected against binding action should one of the flexing contact fingers fail to operate properly. It will now be obvious that the valving of the central opening 40, 58, 60 or 70 of the helical switch members or of the opening 92 of the straight linear type will permit the operator to control the speed at which the pellet P travels in the passageway. It is obvious that the valve need not be installed in instances where the speed is not a critical factor. It will also be obvious in the case of the modification as shown in FIGURES 6, 7, 8 and 10, that the valving operation will permit the plural pellets P to move at different speeds or at similar speeds in order to control various programming operations.

It will also be further obvious that instead of a positive pressure into the tube T, a negative pressure may be applied. This will enable the operator to return the pellet P back to its original position or to any desired position by merely reversing the flow of fluid in the channel or passageway. If the plate members as for example 18 and 20 are transparent, the operator can observe the progress of the pellet P through the passageways. He will then know when to reverse the flow of air or other fluid therethrough depending upon switching desires.

It will be obvious that a pressure supply may be connected at both ends of the channel if so desired in order to give more rapid operation in reversing techniques.

With respect to FIGURE 11, it will be obvious that in order to obtain proper flow through the passageways 90 and 98, certain valving mechanisms not shown can be utilized as well known in the pneumatic dispatch art.

With respect to FIGURE 12, it will be obvious that the hollow pellet P may be compressed slightly in the passageway. The walls of the pellet will then tend to bow outwardly to make contact where the contacts are flush with the wall of the passageway and do not project out thereinto as illustrated. Spring fingers (not shown) may be struck from the walls of the pellet P outwardly to afford spring contact with the walls of the passageway and the flush contact surfaces. Other similar means may be also provided.

*Summary*

In summary, this invention permits sequential operation of various circuits in timed relation depending upon the amount of pressure on the pellet P and the opening of the valve mechanism associated with the passageway. It will also be obvious that reversing operations can be made at any point in the switch block in order to activate a previously passed over circuit merely by changing the flow of fluid in the passageway.

It will be obvious that different types of conductors or pressure type switches might be used in the programming block B. It will also be obvious that various materials can be used for the manufacture of the various components of the block as well as the pellet depending upon whether pressure or conductive type contact is necessary. It will be further obvious that many more than a number of passageways illustrated can be utilized in setting up large scale programming systems.

While this invention has been described in connection with different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention what I claim:

1. A multiple contact programming system including a switch comprising:
   (a) a contact block,
   (b) a uniform tube-like passageway in said block,
   (c) a fluid driven pellet having a cross sectional configuration substantially that of said passageway and movable axially in said passageway,
   (d) contact means in said block operated by said pellet and mounted in the wall of said passageway and said switch including means permitting said pellet to pass said contact means when said pellet is moved in said passageway, (e) means for supplying fluid pressure to one end of said passageway, and (f) means for removing fluid pressure from the other end of said passageway, whereby when said fluid is supplied to said passageway, said pellet is forced by said fluid to travel in the direction of said fluid thereby flow causing operation of said contact means.

2. A multiple contact programming system including a switch as in claim 1 and including, (a) valve means at one end of said passageway for controlling the flow of fluid therein.

3. A multiple contact programming system including a switch as in claim 1 and wherein (a) said contact means includes a pair of pressure sensitive contacts, and (b) said pellet is conductive and makes a circuit when in contact with said pressure sensitive contacts.

4. A multiple contact programming system including a switch as in claim 1 and wherein, (a) said contact block includes a plurality of passageways, and (b) a plurality of pellets including a pellet in each passageway, and including (c) at least one contact means in the wall of each passageway.

5. A multiple contact programming system including a switch as in claim 4 and wherein (a) said fluid supply means supplies fluid to more than one passageway.

6. A multiple contact programming system including a switch as in claim 4 and wherein (a) each passageway is connected to a separate fluid supply means.

7. A multiple contact programming system including a switch as in claim 4 and including (a) a single valve ceans associated with at least two of said passageways for controlling the flow of fluid therein.

8. A multiple contact programming system including a switch as in claim 4 and including (a) a single valve means associated with each of said passageways for controlling the flow of fluid therein.

9. A multiple contact programming system including a switch as in claim 1 and wherein (a) said contact block includes a plurality of passageways, and (b) at least one contact means in the wall of each passageway and including (c) switching means for shifting said pellet from one passageway to another.

10. A multiple contact programming system including a switch as in claim 9 and including (a) a plurality of pressure supplying means spaced at remote positions with respect to said block alternately operable for reversing the direction of travel of said pellets.

11. A multiple contact programming system including a switch as in claim 1 and wherein (a) said passageway is of helical configuration.

12. A multiple contact programming system including a switch as in claim 11 and including (a) a plurality of said contact blocks connected in stacked relationship.

13. A multiple contact programming system including a switch as in claim 11 and including (a) valve means at one end of said passageway.

14. A multiple contact programming system including a switch as in claim 11 and wherein (a) said block includes a continuous spiral wall member, and (b) said wall member positioned and supported between a pair of enclosing plates forming with said wall member said uniform tube-like passageway.

15. A multiple contact programming system including a switch as in claim 1 and wherein (a) said contact block includes a plurality of helical side by side passageways (b) a plurality of pellets including a pellet in each passageway, and including (c) at least one contact means in the wall of each passageway.

16. A multiple contact programming system including a switch as in claim 15 and including (a) a single valve means associated with at least two of said passageways for controlling flow of fluid therein.

17. A multiple contact programming system including a switch as in claim 15 and including (a) a single valve means associated with each of said passageways for controlling the flow of fluid therein.

18. A multiple contact programming system including a switch comprising:

(a) a non-conductive contact block, (b) a uniform tube-like passageway in said block, (c) a fluid driven conductive pellet having a cross sectional configuration substantially that of said passageway and movable axially therein, (d) a series of contacts in said block operated by said pellet and mounted in the wall of said passageway and said switch including means permitting said pellet to pass said contacts when said pellet is moved therein, (e) fluid pressure means for supplying fluid to one end of said passageway, and (f) means for removing fluid from the other end of said passageway, whereby when said fluid is supplied to said passageway, said pellet is forced by said fluid to travel in the direction of said fluid.

19. A multiple contact programming system including a switch as in claim 18 and wherein (a) said passageway is helical, and including (b) a central opening connecting the inner end of said helical passageway.

20. A multiple contact programming system including a switch as in claim 19 and wherein (a) said inner end of said helical passageway includes a pellet stop member subsequent to said contacts.

21. A multiple contact programming system including a switch as in claim 20 and wherein (a) said fluid pressure means is connected to the outer end of said helical passageway.

22. A multiple contact programming system including a switch as in claim 1 and including (a) a plurality of said contact blocks interconnected with one another.

23. A multiple contact programming system including a switch comprising (a) a contact block, (b) a uniform tube-like passageway in said block, (c) a fluid driven pellet having a cross sectional configuration substantially that of said passageway and movable axially in said passageway, (d) circuit connector means mounted in the wall of said passageway so as to be engaged by said pellet when said pellet is moved therein, (e) means associated with said switch for maintaining contact pressure between said pellet and said circuit connector means when said pellet engages said circuit connector means, (f) means for supplying fluid pressure to one end of said passageway, and (g) means for removing fluid pressure from the other end of said passageway, whereby when said fluid is supplied to said passageway said pellet is forced by said fluid to travel in the direction of said fluid thereby causing operation of said circuit.

24. A multiple contact programming system including a switch as in claim 22 and wherein
  (a) said pressure maintaining means includes a flexible wall on said pellet.

25. A multiple contact programming system including a switch as in claim 22 and wherein
  (a) said pressure maintaining means includes a spring urged contact on said circuit connector means.

References Cited by the Examiner
UNITED STATES PATENTS
2,875,291  2/1959  Armstrong et al. _____ 200—81

BERNARD A. GILHEANY, *Primary Examiner.*

G. MAIER, *Assistant Examiner.*